United States Patent
Taylor

(10) Patent No.: US 8,918,621 B1
(45) Date of Patent: Dec. 23, 2014

(54) BLOCK ADDRESS ISOLATION FOR FILE SYSTEMS

(75) Inventor: Cimarron D. Taylor, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 565 days.

(21) Appl. No.: 13/248,477

(22) Filed: Sep. 29, 2011

(51) Int. Cl.
*G06F 12/00* (2006.01)

(52) U.S. Cl.
USPC ............... 711/209; 711/173; 711/E12.078; 707/822; 707/E17.032

(58) Field of Classification Search
None
See application file for complete search history.

(56) References Cited

U.S. PATENT DOCUMENTS

| | | | | |
|---|---|---|---|---|
| 5,680,586 A | * | 10/1997 | Elkins et al. | 707/E17.01 |
| 6,571,261 B1 | * | 5/2003 | Wang-Knop et al. | 707/E17.01 |
| 7,873,619 B1 | * | 1/2011 | Faibish et al. | 707/823 |
| 2001/0054131 A1 | * | 12/2001 | Alvarez et al. | 711/170 |
| 2010/0115011 A1 | * | 5/2010 | Callahan et al. | 707/828 |
| 2011/0060778 A1 | * | 3/2011 | Dallari et al. | 707/829 |

* cited by examiner

*Primary Examiner* — Michael Krofcheck
(74) *Attorney, Agent, or Firm* — Barry N. Young

(57) ABSTRACT

The performance and efficiency of file systems for data allocation access in random-access storage media is enhanced by isolating block addresses from other metadata and the actual data itself in a separate address space. Block addresses are stored in memory and file system structures that are separate from those structures that store other metadata and the actual data. This affords faster address lookup and access to data storage locations, and more efficient storage allocation and accessing algorithms. The block address isolation may be implemented in separate logic, in a hardware controller for a storage drive, or in software in a storage hierarchy.

14 Claims, 4 Drawing Sheets

Separately addressed and access structures

BLOCK ADDRESS ISOLATION FOR FILE SYSTEMS

BACKGROUND

This invention relates generally to file systems, and more particularly to systems and methods that allocate data storage to facilitate access and retrieval of data in storage devices.

State of the art random-access data storage devices include magnetic disks drives, optical drives, solid-state drives and random access memories. They are typically managed by interfaces that reflect the capabilities and limitations of the underlying physical devices. The historic organizational model for random-access storage interfaces is that of a logical or physical disk unit having a given number of platters, cylinders, tracks and sectors. Modern storage devices have standardized around the concepts of blocks and block addresses Applications, operating systems and databases generally delegate most of the work involved in managing random-access devices to file systems which are responsible for organizing data blocks and block addresses into more manageable organizational units such as files and directories. Two important organizational subsystems within a file system are the storage subsystem and the metadata subsystem. The storage subsystem manages which blocks belong to which files, tracks the order of blocks within each file, and tracks the blocks which are unused and are free for future allocation to a file in order to support operating system interfaces, such read, write, seek, etc. The metadata subsystem, on the other hand, manages the names and attributes of files, and tracks file access activity to support the higher-level operating system interfaces such as open, close, rename, etc. The performance of a file system is characterized by how efficiently it supports a given pattern of file access. File system performance, which is a significant factor in the performance of operating systems, applications and databases, is often a bottleneck because an application cannot begin to work on data until the file system guides the operating system in locating and transferring the data. File systems should facilitate the location and transfer of data as efficiently as possible given a particular configuration of random-access devices which may have different storage and I/O characteristic. In large storage systems particularly, significant time is frequently required merely to locate desired data and to allocate space for storing data so that it may be retrieved efficiently.

Another contributor to the overall efficiency of a file system is its ability to support periodic or dynamic reorganization of the file data to prevent or eliminate fragmentation, increase locality of commonly accessed data, and to migrate infrequently accessed data to appropriate storage areas or devices. This requires efficient access to the details of file system data allocation. Locating data in large storage systems, for example, is particularly time-consuming and burdensome. Utilities intended to improve file organization, such as commonly used defragmentation tools, are typically quite inefficient and significantly increase the I/O and processing burden of CPUs. What is needed is a mechanism that affords efficient access to a file system's underlying allocation of data with minimal overhead.

It is desirable to provide systems and methods for allocating data that address the foregoing and other problems with known file system data allocation approaches and that afford efficient access and retrieval of data in data storage devices. It is to these ends that the present invention is directed.

DESCRIPTION OF PREFERRED EMBODIMENTS

The invention is particularly well adapted for use with large data storage systems and with UNIX-type file systems, and will be described in that context. However, it will be appreciated that this is illustrative of only one utility of the invention and that the invention has applicability to other types of systems and other file systems.

Figure 1:
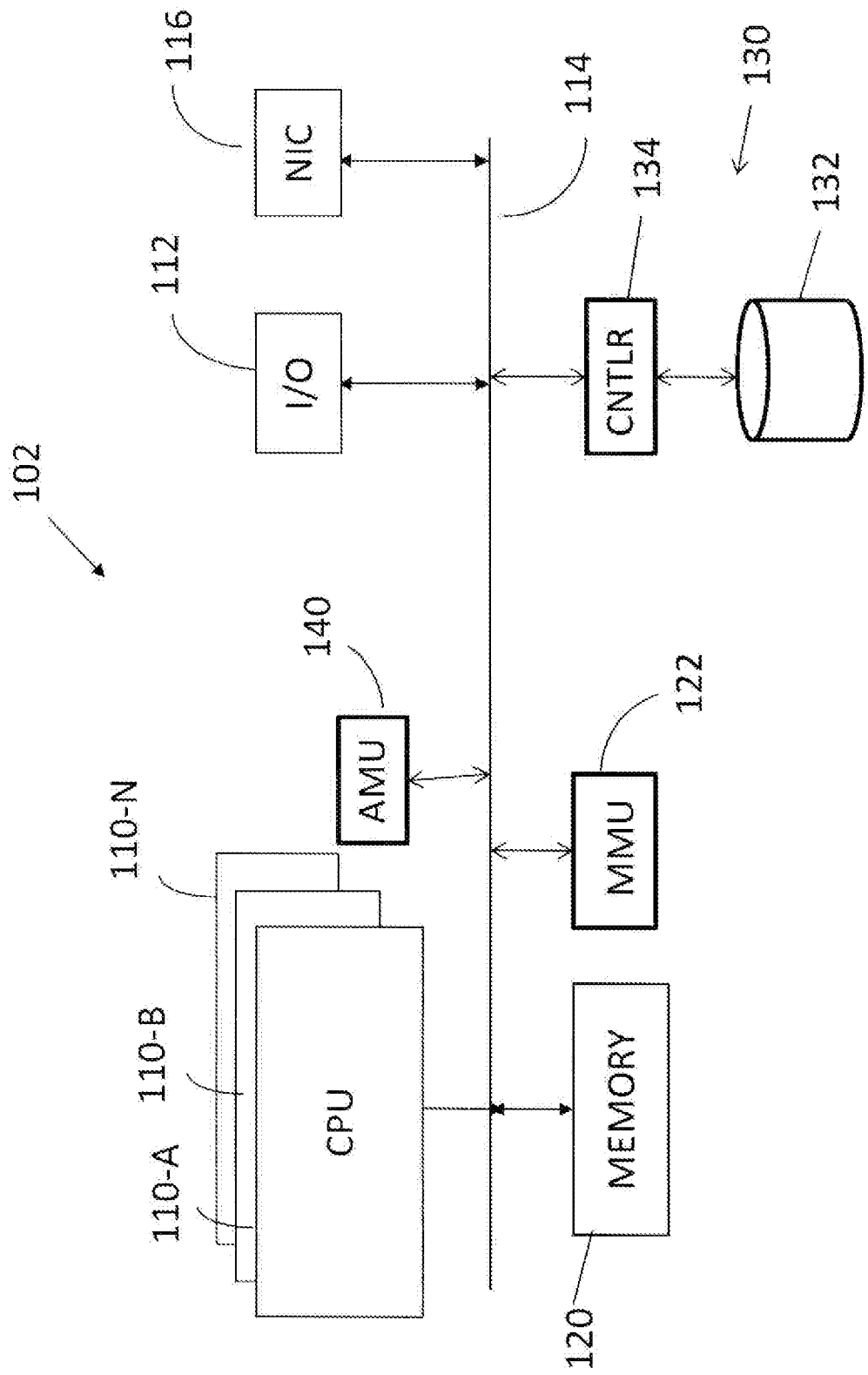
FIG. 1 is a block diagram illustrating a computer system incorporating embodiments of the invention.

FIG. 1 illustrates the architecture of a computer system 102 configured to implement operations in accordance with the invention. The system may comprise a computer or CPU 110 that may comprise a single core processor, or may be a multi-core processor having N processing cores 110-A-110-N connected to input/output (I/O) devices 112 by a communications bus 114. The I/O devices may comprise storage units as well as other standard computer system input and output devices. A network interface circuit (NIC) 116 may also be connected to bus 114 to allow the system to operate in a networked environment. The system may further have a memory 120 connected to the bus that comprises a computer readable storage medium for storing executable instructions to control the operation of the computer 110 to perform processes in accordance with the invention. Memory 120 may comprise, for example, solid state semiconductor memory, magnetic media, optical media, and other types of memory, and combinations thereof. A memory management unit (MMU) 122 may also be included to manage memory 120. Although the MMU is shown connected to the bus, it may instead be incorporated on-chip with the processor. The system 102 may further have a storage subsystem 130 comprising a disk drive 132 connected to the bus 114 through an associated drive controller 134.

As will be described, in one embodiment, disk controller 134 of storage subsystem 130 may incorporate logic or a dedicated processor that performs address allocation operations in accordance with the invention. In another embodiment, one of the processor cores 110-A through 110-N may perform such functions; and in yet another embodiment, system 102 may incorporate a dedicated special purpose intelligent allocation management unit (AMU) 140 to perform these operations. As with the MMU 122, AMU 140 may also be incorporated on-chip.

Memory 120 may store operating system programs for the processor cores that determine the file system that is used and which together with application programs control the operations of the processors 110. A portion of memory 120 may also be dedicated to storing block address allocation information, as will be described. The manner in which data is stored, retrieved and processed is determined by the file system and the operating system used by the computer system processor (s).

A file system is a structure for organizing collections of data. A file system holds not only the actual data that is contained within the files of the file system, it also holds all of the information that users and processes see as files, directories links, and administrative information or metadata. Importantly, file systems also allocate storage locations (addresses) to data and provide address allocation information to facilitate data storage and retrieval. There are many different file systems that may be used in processing systems. Most if not all file systems suffer to some degree from the problems addressed by the invention.

Figure 2:
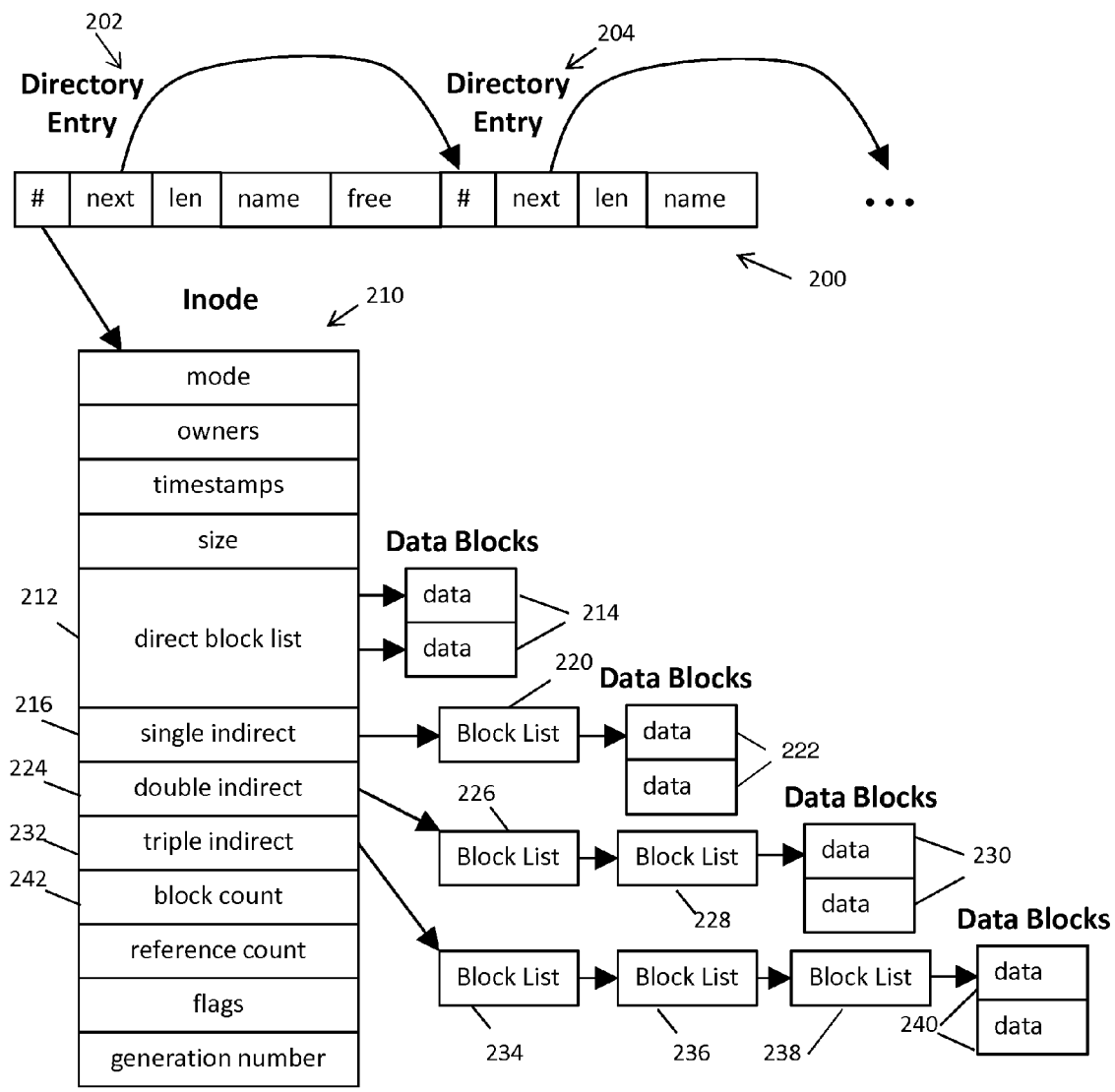
FIG. 2 is a diagrammatic view that illustrates a traditional Unix-type of file system structure.

FIG. 2 illustrates a traditional UNIX-type file system which will be used to provide background and context for the invention. As noted above, this file system is merely representative of file systems of the type with which the invention may be employed. Other such file systems include, for example, EXT2. Prior to describing the invention, the UNIX file system will be described as this will facilitate a better understanding of the invention.

As shown in the figure, the UNIX-type file system has a directory file 200 comprising a series of directory entries 202, 204 comprising groups of directory blocks which hold data relevant to the directory entries. The directory blocks are all of the same length or size. The blocks comprise a first block (#) that provides the number of an Inode entry for a file; a block (next) that provides a pointer to the next Inode block number for the file; a block (len) that gives the length in bytes of the file; a block (name) that indicates the filename; and a block of free space that allows changes to the name without having to change all of the data. An Inode is a basic building block of the file system. Every file and directory is described by one and only one Inode. Inodes may also describe special device files, which are not real files but handles that programs can use to access devices.

As shown in the figure, the Inode 210 comprises a data structure having a plurality of entries which provide administrative metadata about a file and indicate the blocks in which the actual file data resides. Administrative information includes, for example, information about the owner(s) of the file, the time it which was created, its size in bytes, access rights and permissions (mode), as well as entries for a reference count, flags and generation number of the named file. The Inode also includes pointers to the locations of blocks that contain the data that the Inode describes. A direct block list 212 provides a set of pointers to a first group of blocks 214 containing the data that the Inode describes. This allows to data in blocks 214 to be accessed directly (and quickly). Other blocks in the Inode provide indirect pointers to the locations of data blocks. For example, a single indirect block 216 of the Inode provides a pointer to a block list 220, which in turn provides pointers to physical data blocks 222. A double indirect block 224 points to a block list 226 which, in turn, points to another block list 228 which provides pointers to data blocks 230; and a triple indirect block 232 of the Inode provides three levels of indirection through block lists 234, 236 and 238 to data blocks 240.

Accessing data indirectly through the single, double and triple indirect blocks is more time-consuming and I/O intensive than accessing data directly. Accessing data via a block list requires a first I/O to access the block list, reading the block to determine a pointer to the actual data blocks and another I/O to access these data blocks. Similarly, a block list which points to another block list that further points to the actual data blocks requires additional I/Os an additional time to access the data. In large data processing systems having many processes that require I/O, access requests are queued and must contend with other processes for an I/O. Lengthy access times and high frequencies of access (I/O) requests are universal problems that can substantially slow down the access and retrieval of data, and hinder system performance, particularly if the allocation requirements are growing rapidly. Moreover, since one cannot store data in memory or on disk until you know where to put it, i.e., where there is available space that can be allocated to the data, if requests to write data are being serviced as ordinary read/write requests in the same queue as other I/O, data writing operations can dominate other I/O operations, substantially impacting performance.

As will be described, the invention, in one aspect, addresses these problems by separating data allocation information from other types of metadata information and actual data so that the data allocation information can be accessed very efficiently and quickly. This is preferably accomplished by isolating block addresses from other metadata by providing a separate address space for block address allocation information from the address space used for other metadata and actual data. This enables separating out block address allocation information from other types of information, and putting allocation information in its own separate queue from other data access requests. Moreover, since block address allocation information is typically small compared with other types of metadata (only 32 or 64-bits are required for addresses), allocation information may be stored in small condensed areas which can be rapidly accessed in parallel with other processes using existing or newer optimized access algorithms. Furthermore, access processes and can be assigned to smaller, faster, higher performance storage devices, such as solid-state memory or SSDs, or handled by separate higher performance I/O devices.

For example, in the storage subsystem 130 of FIG. 1, disk controller 134 may incorporate logic or a dedicated processor, as described above, which can handle access requests for block addresses. In hybrid disks that incorporate both SSD and standard magnetic media, a portion of the SSD may be used for the separate address space. Alternatively, one or more platters or a portion of a platter of a standard disk may be reserved for the separate address space. Also, AMU 140 may be a special purpose device to handle block address allocation, access and retrieval.

Figure 3:
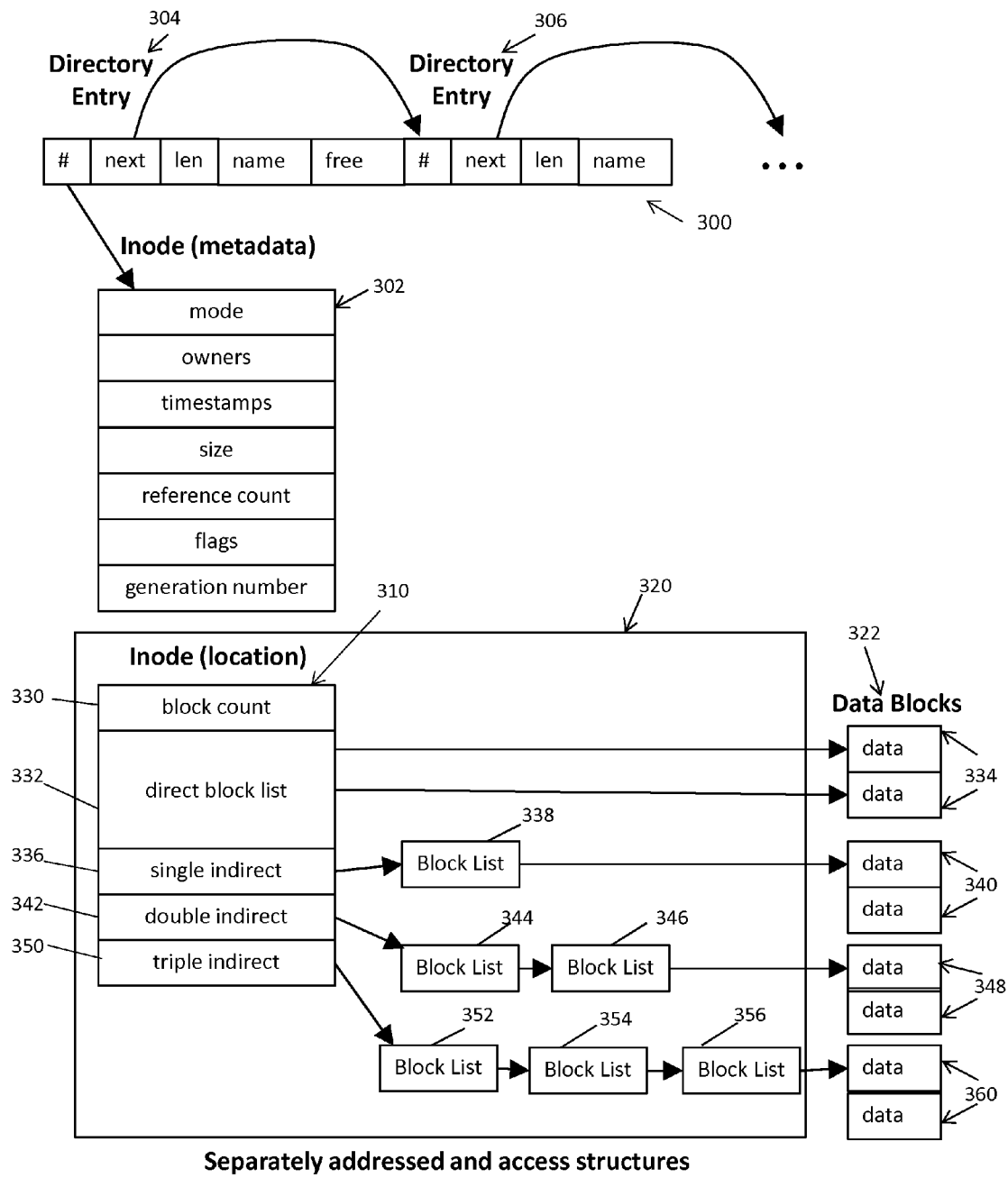
FIG. 3 is a diagrammatic view that illustrates an embodiment of a file system structure in accordance with the invention.

FIG. 3 illustrates a file system such as shown in FIG. 2 reorganized in accordance with an embodiment of the invention. As shown in the figure, non-allocation Inode metadata 302 of a directory entry 304 of a directory file 300 is separated from Inode address allocation information 310 and placed in separately addressed access structures 320 which have their own separate address space from the address space for metadata 302 and the data blocks 322 that store the actual data. The Inode allocation information 310 comprises a block count block 330, a direct block list 332 that points directly to data first blocks 334, a single indirect block 336 that points to a block list 338 with pointers to data blocks 340, a double indirect block 342 that points through a pair of block lists 344 and 346 to data blocks 348, and a triple indirect block 350 that points through three block lists 352, 354, and 356 to data blocks 360.

Figure 4:
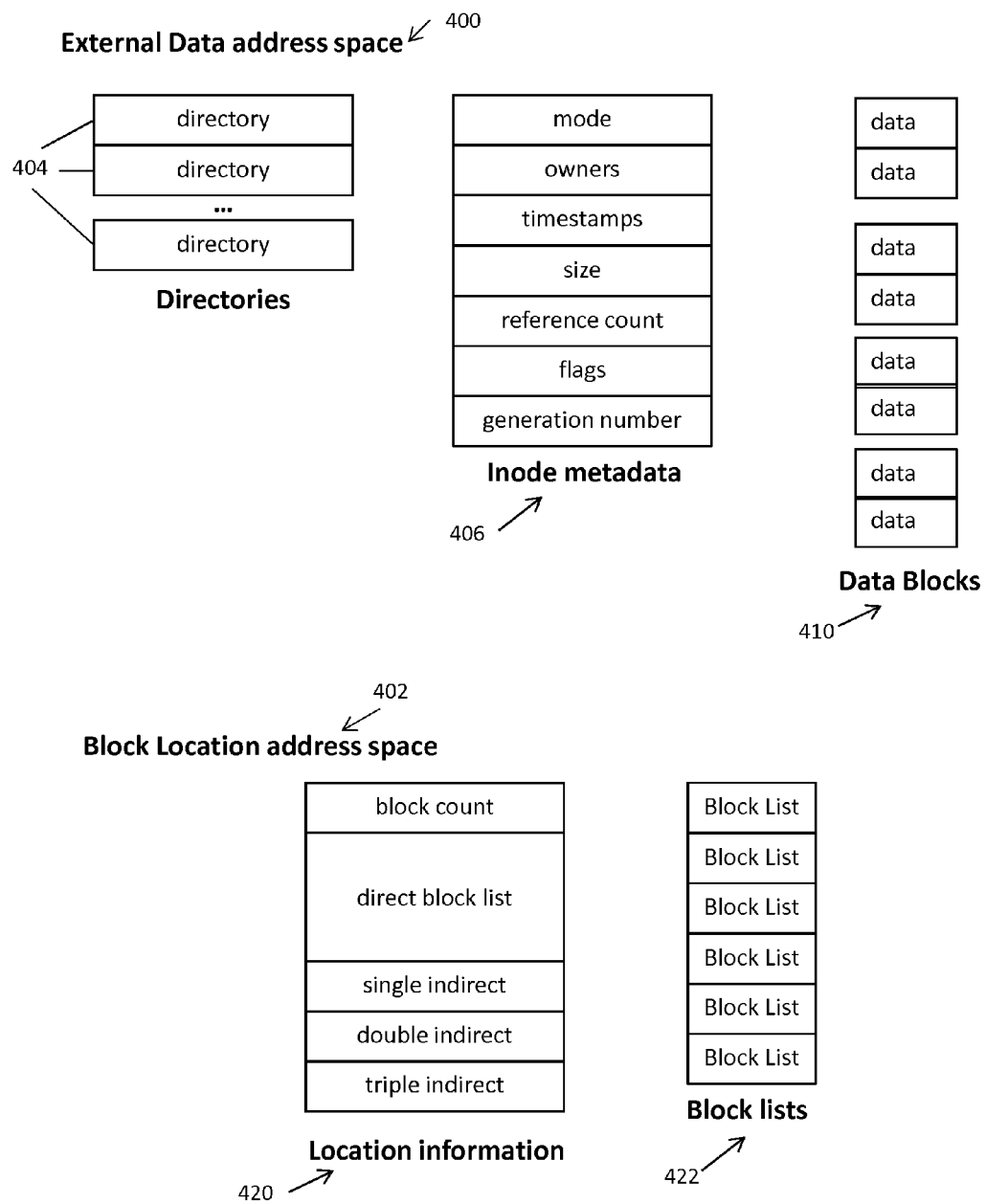
FIG. 4 is a diagrammatic view that illustrates separate address space allocations in accordance with the invention.

FIG. 4 illustrates the allocation of address space in accordance with an embodiment of the invention. As shown, the address space is divided into external data address space 400 and block location address space 402. External data address space includes address space for directories 404, the non-location Inode metadata 406, and data blocks 410 which store the actual data. The separate block location address space 402 provides address space for Inode allocation location information 420 for each directory entry in directories 404, and address space for block lists 422 that provide pointers to data blocks 410.

Inode structures in accordance with the invention, such as shown in FIGS. 3 and 4, which separate block address information from other metadata and actual data its own separate address space are highly advantageous and afford significant gains in performance, reliability, functionality and security of data and software applications. Providing a separate address space for allocation information allows direct allocation requests to one or more individual is a significant advantage in optimizing file systems. Separating Inode block address allocation information and block lists from other file system data allows placing it on dedicated high performance devices, as well as on separate virtual data centers and cloud. Inode allocation structures may be embodied within a separate module within a file system having its own dedicated devices, as, for example, logic embedded in a traditional I/O controller, or as dedicated LBA separation bits within an I/O device or a hierarchy of I/O devices. In a multi-core processing system, a separate core can be assigned to processing allocation information requests, and in a single (or multi-core) processor system a separate hardware module similar to a memory management unit (MMU) may manage allocation requests.

Another advantage to separating block addresses from other metadata in its separate address space is that it affords a fast, efficient access to block allocation information. This can be a significant advantage in preventing or eliminating data fragmentation. Defragmentation tools, for example, typically separate work into two different phases, a pre-calculation phase and a copy phase. In the pre-calculation phase, an existing storage map is constructed from a scan of the file system's allocation structures, and a new storage map with a more optimal allocation is built. In the copy phase, the underlying data blocks are copied to the new map locations, and the file system's organizational structures are updated to reflect the new locations. Defragmentation tools significantly increase the I/O and processing burdens of systems. Providing a separate address space for allocation information as done in accordance with the invention allows fast, efficient access to a file system's underlying allocation data with minimal overhead. This allows defragmentation processes to run faster and more frequently, which contributes to maintaining an efficient data space allocation on storage devices.

Furthermore, storage management processes involve the capture and consolidation of statistical information about data access patterns to permit better management and forecasting. The exhaustion of available space on storage devices and device I/O failures are significant causes of downtime. Capturing statistics about storage accessing activities is important for capacity planning, fault diagnosis, and security investigations. Isolating block addresses from other metadata information facilitates capturing of such statistics, and leads to better system management.

While the foregoing description has been with reference to particular embodiments of the invention, it will be appreciated that changes to these embodiments can be made without departing from the principles and the spirit of the invention, the scope of which is defined by the appended claims.

The invention claimed is:

1. A method of managing block addresses of data blocks containing file data in a file system of a computer, comprising:
isolating block address information from file data and other information by storing said block address information in a first block address space that is separate from another second address space for said file data and other information, said block address information comprising direct block addresses of file data and indirect addresses of block lists having pointers to file data, said file system providing a data structure for each directory entry, the data structure comprising an Inode and containing metadata about said directory entry and said direct block and indirect block list addresses, and wherein said isolating comprises storing said metadata in said second address space and separating said block address information from the Inode.

2. The method of claim 1 further comprising providing a first storage structure for said first block address space that is separate from a second storage structure that stores said file data and other information.

3. The method of claim 2, wherein said first storage structure for said block address space is on a separate device from said second storage structure.

4. The method of claim 3, wherein said first storage structure comprises a processor for managing said first address space that is separate from another processor that manages said second address space.

5. The method of claim 3, wherein said first storage structure comprises solid state storage in a special purpose device having a processor.

6. The method of claim 1 further comprising using the block address information in the first block address space to manage fragmentation of data files in said second address space.

7. A computer system for managing block addresses of data blocks containing file data, comprising a first data structure for storing block address information for said file data; a second data structure for storing file data and other information related to said file data; the first data structure having a first address space for said block address information; and the second data structure having a second address space for said file data and said other information, the first address space being separate from said second address space, the computer system providing an Inode for each directory entry for file data and said other information for said file data, and said block address information being isolated from said Inode.

8. The computer system of claim 7, wherein said block address information comprises direct block addresses of file data and indirect addresses of block lists having pointers to file data.

9. The computer system of claim 7, further comprising first and second storage structures for respectively storing said first and second data structures for each directory entry for file data said first and second storage structures being on separate processor devices.

10. Computer readable non-transitory storage medium for storing instructions for controlling the operation of a computer to managing block addresses of data blocks containing file data in a file system of a computer, comprising instructions for:
isolating block address information from file data and other information by storing said block address information in a first block address space that is separate from another second address space for said file data and other information, said block address information comprising direct block addresses of file data and indirect addresses of block lists having pointers to file data, said file system providing a data structure for each directory entry, the data structure comprising an Inode and containing metadata about said directory entry and said direct block and indirect block list addresses, and wherein said isolating comprises storing said metadata in said second address space and separating said block address information from the Inode.

11. Computer readable non-transitory storage medium according to claim 10, wherein there is a first storage structure for said first block address space that is separate from a second storage structure that stores said file data and other information, and further comprising instructions for allocating storage locations in said second address space for data, and storing address information to such storage locations in said first address space.

12. Computer readable non-transitory storage medium according to claim 11, comprising instructions responsive to an access request for data stored in said second address space for looking up in said first address space an address for a location of said data stored in said second address space.

13. Computer readable non-transitory storage medium according to claim 10, wherein said first address space is located in a first storage structure and said second address space is located in a second storage structure that is separate from said first storage structure, and wherein said instructions control a dedicated processor associated with the first storage structure.

14. Computer readable non-transitory storage medium according to claim 10, wherein said computer has a file system that has a first data structure for said first block address space and a second data structure for said second address space, and said instructions manage said first data structure.

* * * * *